United States Patent [19]
Steen et al.

[11] 4,146,344
[45] Mar. 27, 1979

[54] V-SHAPED OIL CONTAINMENT BOOM

[75] Inventors: Jim W. Steen, Calgary; John Bennett; Ian McAllister, both of Vancouver, all of Canada

[73] Assignee: Bennett Pollution Controls, Ltd., North Vancouver, Canada

[21] Appl. No.: 803,803

[22] Filed: Jun. 6, 1977

[51] Int. Cl.² .............................................. E02B 15/04
[52] U.S. Cl. ..................................... 405/68; 405/26; 405/61; 405/63
[58] Field of Search ................ 61/1 F, 5; 210/242, 210/DIG. 25, DIG. 26

[56] References Cited
U.S. PATENT DOCUMENTS

| 3,218,809 | 11/1965 | Rhodes et al. | 61/5 |
| 3,653,213 | 4/1972 | Childers | 61/1 F |
| 3,686,869 | 8/1972 | Manuel | 61/1 F |
| 3,800,542 | 4/1974 | Cerasari | 61/1 F |

Primary Examiner—Mervin Stein
Assistant Examiner—David H. Corbin
Attorney, Agent, or Firm—Lerner, David, Littenberg & Samuel

[57] ABSTRACT

An oil containment boom is provided herein. It includes an elongated member of generally V-shaped cross-section, which is provided by a front wall section and a (preferably higher) rear wall section, joined together along respective lower edges. Ballast means are provided for normally maintaining the elongated member upright with the joint between the front and rear walls at the bottom. Float means (preferably inflatable) are provided, which are disposed between the front wall and the rear wall at a predetermined and preselected level above the joint. Drainage means are provided within the front wall to permit polluted liquid which has rolled over the front wall and is trapped in the V-shaped member constituted by the front and rear walls to escape therefrom to an area upstream of the front wall. A novel method of containing oil spills in ice infested water is also provided.

9 Claims, 7 Drawing Figures

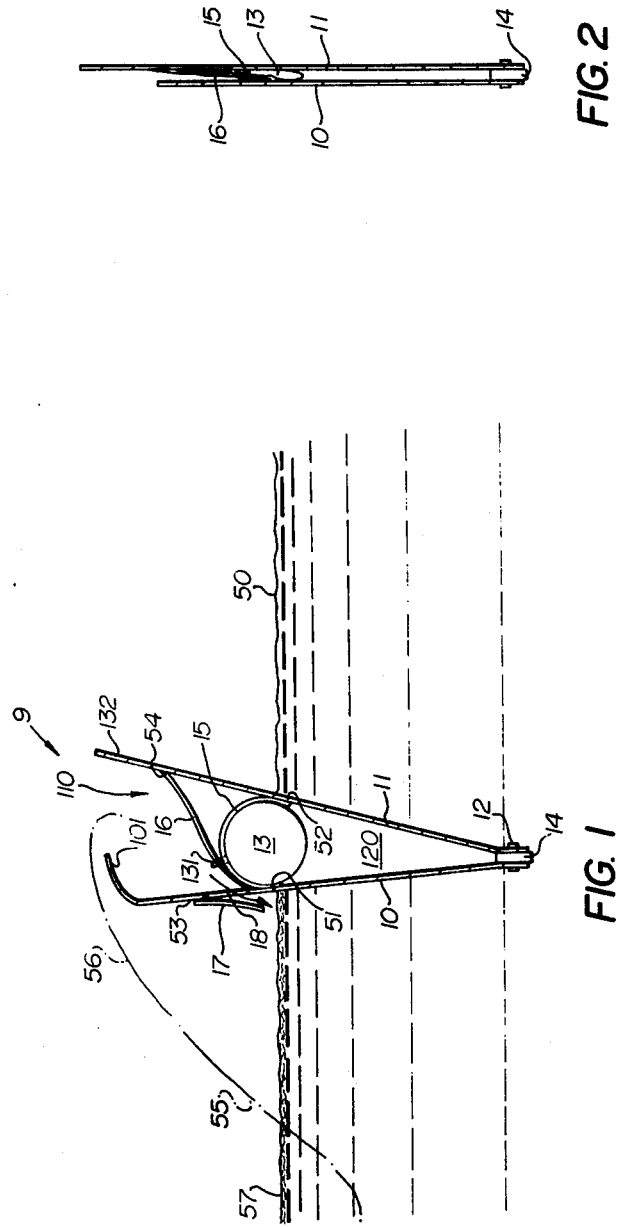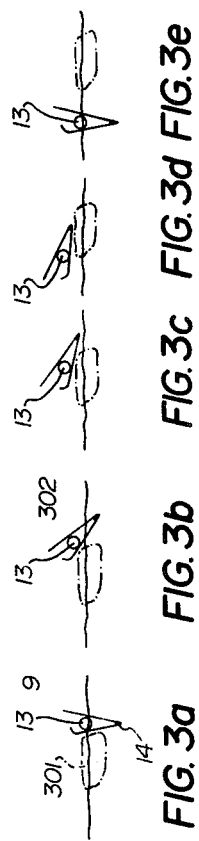

V-SHAPED OIL CONTAINMENT BOOM

BACKGROUND OF THE INVENTION (i) Field of the Invention

This invention relates to a novel flexible floating boom for containing surface contaminants on bodies of water. In particular it relates to an oil containment boom having the floating means disposed therewithin and to a novel method for containing oil spills in ice-infested waters.

(ii) Description of the Prior Art

With the tremendous rate of industrialization that is taking place throughout the world, pollution of bodies of water by oil spills is reaching critical proportions. Not only are major oil spills occurring, such as, for example, when an oil tanker is wrecked, but also minor oil spills are a daily occurrence throughout the world. Many different systems are being tested for removing the effects of these oil spills and one of the most successful techniques has been to contain these spills by means of booms and then to collect the contained oil from the surface of the water, e.g., by skimmers. Such oil booms can be used not only for containing a major oil spill but can also be used for isolating terminals from a permanent installation, temporarily encircling tankers which are being loaded and unloaded, sweeping port areas for removing floating patches of oil, protecting beaches, etc. In order to provide the necessary versatility, these oil booms must be inexpensive, light and easy to store and handle.

One such oil boom is in the form of a flexible fabric curtain wall which floats in the water with part of the curtain wall extending a distance below the water surface and a part extending above the water surface. Some of these flexible booms are supported in the water by means of separately attached floats. Spaced vertical stiffeners are provided to maintain the boom in the necessary vertical position and they are stabilized by means of weights along the bottom submerged edge. These booms are made up and stored in convenient sections, e.g. of about 100 feet in length, and when needed are attached together and deployed in the water to surround and contain the oil spill.

When such booms are used in adverse sea and wind conditions, there is a tendency for them to fail because of tearing under the strain of the sea or ice conditions and also a tendency for the attached floats to be torn away, or damaged, thus allowing the boom to become submerged in certain areas and consequently defeating the entire purpose of trying totally to contain the oil spill. Accordingly, there is a very great need for a flexible oil boom system which will be very inexpensive to produce, easy to handle and yet have sufficient strength to withstand adverse sea and wind conditions as well as to withstand any serious damage from ice floating on the surface of the water.

Canadian Patent No. 906,772 attempted to solve such problem by providing a flexible oil boom comprising a curtain wall of sheet material having an upper portion and a lower portion. These upper and lower portions were joined together by an overlapping connection at a location below the water line. At spaced locations along the length of the joint between the upper and lower portions, flexible straps were positioned, which surrounded the lower edge of the upper portion and passed through the overlapping connection between the upper and lower portions so that the straps provided extending ends on either side of the boom. These straps were used for connecting the float members to the boom. The upper edge of the boom was preferably formed with a longitudinal pocket which contained a strengthening rope and a similar longitudinal pocket with strengthening rope was also preferably provided at the bottom edge. Vertical pockets were also provided along the boom at longitudinally spaced positions and these pockets contained stiffening members for holding the boom in a vertically upright position.

It is, moreover, frequently necessary to skim oil slicks in harbour areas. However, present skimmers encounter considerable resistance in being towed through the water and are difficult to handle. It has also become desirable to contain oil slicks resulting from underwater leaks or leaks from injured vessels. However, the great majority of boom systems proposed for such use do not survive long in rough seas. In addition, many of the more rigid boom systems do not conform to the contours of the waves sufficiently fast to prevent the passage of oil beneath sections which are left hanging in the air.

Canadian Pat. No. 912,293 attempted to provide a solution to such problem by providing a flexible boom comprising at least one elongated flexible floatation unit, a flexible weighted net supported in a substantially vertical position by that at least one elongated floatation unit when the boom was placed in a body of water, and at least one layer of flexible filtering material, that layer of flexible filtering material being associated with the weighted net to conform generally to the vertical positioning and movement of the weighted net. The layer of filtering material was formed of hydrophobic, oleophilic material having a plurality of passageways therethrough permitting the flow of water through the boom while substantially preventing the flow of liquid hydrocarbonaceous matter through the boom.

Another problem attendant in the use of such booms is that the basically heavy and bulky nature of such known booms make both the storage and handling thereof difficult. By the same token, notwithstanding the weight and bulk of these retainers, such often incorporate a relatively low tensile strength, both in the individual sections and in the joining portions, thus limiting the lengths which can be effectively used, both as a standing barrier and as a towed gathering unit.

Canadian Pat. No. 912,294 attempted to provide a solution to such problem by providing such a boom comprising an elongated depending skirt having upper and lower edges, with a float section defined longitudinally along the upper edge of the skirt, and a ballast section defined longitudinally along the lower edge of the skirt. A first male joining end was defined at one end of the retainer, and a second female joining end was defined at the second end of the retainer, the female joining end being of a size and configuration so as telescopically to receive the male end of an adjoining retainer. Means were associated with the ends for interconnecting a pair of telescoped ends, such retainer being formed of an elongated flexible sheet longitudinally folded to define a skirt forming pair of adjacent panels bounded along the upper edge by a longitudinally extending enlarged pocket constituting a portion of the float section. A relatively smaller longitudinally extending second pocket was provided along the lower edges of the panel for the reception of ballast. The second pocket constituted a portion of the ballast section. Means were provided for securing the skirt defining panels together along substantially the full length thereof. Float means were received within the first mentioned pocket, the float means, ballast and securing means terminating short of the second female joining end for enabling the reception of the first male joining end therein. A pair of cooperating securing collars was provided, one collar being mounted on and surrounding the float section adjacent each end of the retainer. The collars each had an inner edge fixed to the float section and an unsecured outer edge directed toward the corresponding end of the retainer. The collars were adapted telescopically to engage with the corresponding collars on adjacent retainers upon an interengagement of the male and female joining ends thereon. Means were associated with the collars for interconnecting a pair of telescoped collars.

Other problems are inherent in the use of such oil barriers. The oil slick may vary from a mere fraction of an inch up to a foot or more in thickness. Therefore the barrier must extend to a sufficient depth to avoid the passing of the oil beneath the barrier; the probability of this passing of oil is increased by the action of each of the waves and swells of normal sea action or as caused by passing vessels, including large cargo ships and ocean liners. However, as the depth of the barrier increases, a larger float is required, and particularly a material of substantially greater strength is required which will withstand the great force of wave and swell action as well as withstand the bombardment by miscellaneous trash-missiles, for example including objects up to the size of telephone poles.

Another problem arises from the fact that many materials tend to sink or to disintegrate when they become saturated with oil or water. Oil in particular results in extensive degradation. Thus the material must remain afloat, and must be oil-resistant.

Another problem is that an oil barrier which might overcome some of the above and other problems would normally be highly expensive, complex, and too bulky to be of practical value in most instances.

Canadian Pat. No. 914,435 attempted to solve such problem by providing a buoyant barrier boom comprising a substantially rigid sheet-structure comprising a first sheet of a substantially oil-resistant synthetic composition and closed-cell foam composition attached to the sheet-structure in a manner whereby that sheet-structure floated when placed in water in a substantially vertical position relative to the water's surface. About one-eighth to about two-thirds of the first sheet extended above the water surface by at least about 0.5 foot, and extended below the water's surface at least a sufficient depth (at least about one foot) to maintain the sheet in the substantially vertical position.

Yet another problem inherent in the use of such floating booms was that some such booms allowed oil to escape both under and over the boom when used in the open sea or in rough water due to the wave action and instability of the boom.

Canadian Pat. No. 936,372 purported to solve such problem by providing a floating boom comprising a plurality of connector cables, and a plurality of upright support members attached to the connector cables, the upright support members having a first curved end portion inwardly disposed towards the oil spill being contained or collected and a second weighted end portion. A buoyant support tube was attached to the upright support member, the buoyant support tube having a valve means for inflating the buoyant support tube with compressed gas from a source of such gas. A barricade wall material was provided for collecting and containing the oil attached to the upright support members. The connector cables were adapted to be attached to at least one seagoing vessel to position the floating boom around an oil spill to form an oil barricade to contain or collect the oil spill.

(iii) Particular Problems with the Prior Art

Moreover, nowhere is the threat to the environment more acute than in the northern oceans where rough seas and heavy ice conditions increase the magnitude of the problems associated with controlling oil spills, and where potential damage to the environment may have lasting and sever implications.

Although as described above numerous oil containment booms have been proposed, none are able to cope with conditions encountered in ice-infested, choppy water, and in areas where there is dominant breaking wave action by the seas forming white-capped waves.

One of the problems with booms in steep choppy waves is the difficulty in making a boom respond quickly to such fast rising waves. Even if the boom follows the wave itself, it is almost impossible to make it respond to the breaking whitecap and have it buoyant enough to rise fast and high enough to keep above and catch the whitecap which is of less density, containing both water and air. Consequently, such waves have a tendency to break over normal booms, carrying oil with them.

It has been found further that, in ice, a boom with external tension lines and with external floating attachments traps ice bearing down on it and, being unable to release the pressure exerted by the drifting ice, allows forces to build up until either the boom or the mooring system breaks, thereby making the boom ineffective.

SUMMARY OF THE INVENTION (i) Aims of the Invention

It is therefore an object of the present invention to provide an oil containment boom which is able to contain the oil-impregnated whitecap and spray found in breaking water, and is able to return the polluted water from the whitecaps to the contained area.

It is another object of the present invention to provide an oil containment boom having a minimum of exposed sections which might interfere with floating ice and which minimize a buildup of ice on the exterior and interior of the boom.

It is yet another object of the present invention to provide an oil containment boom which will deflect and which will, thereby, allow passage and escape of floating ice from the confined area but will rapidly return to its normal position for containment of oil on the water surface in the designated area.

It is a still further object of the present invention to provide an oil containment boom which can be easily stored away on a storage reel after being deflated to a minimum storage size.

(ii) Statements of the Invention

By this invention, an oil containment boom is provided comprising an elongated member of generally V-shaped cross-section and provided by a front wall section and a rear wall section, joined together along respective lower edges, ballast means for normally maintaining the elongated member upright with the joint between the front and rear walls at the bottom, float means disposed between the front wall and the rear wall at a predetermined and preselected level above the joint, and drainage means within the front wall to permit polluted liquid which flows over the front wall and is trapped within the V-shaped member to escape therefrom to a position upstream of the front wall.

By this invention, an oil containment boom is also provided comprising: a V-shaped liquid accepting compartment formed of a rear wall section and a front wall section, fastened at the bottom end, weight ballast means positioned at the apex of the joint of the rear wall section and the front wall section, float means disposed within the V-shaped section, means for allowing a liquid to enter the V-shaped compartment and means for allowing the liquid to escape from within the V-shaped compartment.

By this invention, a V-shaped oil containment boom is also provided having cylindrical float means centrally positioned and axially corresponding within the "V" section to allow pivoting of the boom about the approximate axis of the cylindrical float means to permit passage of a solid object beneath the boom, deflecting the boom from its normal position, and allowing rapid return to the normal operating position with minimum interference between the V-shaped boom and any interfering floating object.

By this invention, a method is also provided for containing oil spills in ice-infested waters which comprises: surrounding the oil spill with an oil containment boom comprising an elongated member of generally V-shaped cross-section and provided by a front wall section and a rear wall section, joined together along respective lower edges, ballast means for normally maintaining the elongated member upright with the joint between the front and rear walls at the bottom, float means disposed between the front wall and the rear wall at a predetermined and preselected level above the joint, and drainage means within the front wall; and deflecting the ballast means so that ice impinging on the boom causes the boom to rotate about the point of contact of the ice with the upstream wall of the boom, and permits the boom to regain its upright position when the ice has moved downstream.

(iii) Other Features of the Invention

By one feature of this invention, the float is a pneumatic tube, and is inflated and deflated by means of a valve.

By a second feature of this invention, the float means is centrally positioned within the V-shaped compartment to allow half of the boom to be positioned below the surface of the water.

By a third feature of this invention, the means for allowing the liquid to escape from within the V-shaped compartment comprises a flap valve.

By a fourth feature of this invention, the floating means is separated from the liquid accepting compartment by means of a collapsible membrane.

By a fifth feature of this invention, the ballast means comprises a lead weight sewn to the leading edge of the front wall section and the rear wall section.

By a sixth feature of this invention, the front wall section has the top section curvingly projecting towards the liquid accepting compartment, thereby forming a lower surface obstacle than the rear wall section.

By a seventh feature of this invention, the front wall section and the rear wall section are coated with polyvinylchloride.

By the eighth feature of this invention, the front wall section is lower than the rear wall section.

By a ninth feature of this invention, the front wall section includes a wave catching inwardly directed flange along the top section.

By a tenth feature of this invention, the front wall section includes a flexible resilient section along the top, to permit inwardly directed waves to enter the inside of the boom.

By an eleventh feature of this invention, the boom has deflatable cylindrical float means which allows merging of the front wall section and the rear wall section for easy reeling and storage of the boom.

By a twelfth feature of this invention, the boom includes means for rolling and storing the deflated boom aboard a ship.

It will be observed that the V-shaped boom adds another dimension to the barrier that the whitecap must get over. Breaking whitecaps, will, to a large extent, roll straight over the forward wall into the V-shaped catch area and will drain back out into the contained polluted area. Spray will be caught by the higher wall on the downstream side.

Moreover, the floatation material is preferably protected from contact with the ice. The exposed surface of the boom is devoid of any protrusions so as to cause a minimum of drag or interference with external flotsom or jetsom.

In one variant, since the float means is inflatable, storage of the boom is facilitated, since the boom can be deflated and rolled onto a large storage reel to be subsequently stowed aboard a vessel, thus minimizing storage space.

The boom is also designed to be rotatably deflected by floating ice to allow ice to escape beyond the confined area and then to be automatically returned to its normal oil spill retaining boom position. Thus, these booms which have the tension integral in the material itself, have a tendency to roll up onto the ice, let the ice pass underneath and re-enter the water when the ice has passed through or by. Although some oil will obviously be lost during this action, it is still of advantage to lose, e.g., 500 gallons of oil, but still have the boom intact and operable to trap the next e.g. 50,000 gallons of oil.

BRIEF DESCRIPTION OF THE DRAWINGS

In the accompanying drawings,

FIG. 1 is a transverse cross-section of the boom of this invention;

FIG. 2 is a transverse cross-section of the boom of this invention in its deflated condition; and FIGS. 3a, 3b, 3c, 3d and 3e are schematic cross-sectional views of a sequence of operations showing operation in ice-infested waters.

DESCRIPTION OF PREFERRED EMBODIMENTS (i) Description of FIG. 1

Referring now to FIG. 1, "V"-shaped oil containment boom indicated generally at 9 is shown including a front wall section 10 and a rear wall section 11 disposed about the floatation means, namely, inflatable float 13 provided with an air valve 131. Walls 10 and 11 are disposed tangentially in relation to the float means at approximately the mid point of the height to permit the approximate lower halves of the front wall section 10 and the rear wall section 11 to be positioned below the normal level 50 of the water surface. The lower sections of the front wall 10 and the rear wall 11 converge and meet at an apex 12. Disposed between and connected to walls 10 and 11 is a lead ballast 14 for maintaining the V-shaped floating wall sections in a basically vertical position while in water, with its apex 12 pointing downwardly.

The top diverging walls 10 and 11 rise beyond the inflatable float 13 to a position approximately equal to the length of the wall sections 10 and 11 displaced below the water surface. A float harness 15 is secured at approximately the vertical mid point of the interior face at longitudinal area 51 of front wall section 10 and of the interior face at longitudinal area 52 of rear wall section 11, and forms an inverse V-shaped harness adapted to straddle the inflatable float 13, thereby providing support for the wall sections 10 and 11. Conventional means are used to adhere the harness 15 to the float 13.

Positioned and secured along the entire length of front wall 10 at longitudinal area 53 is membrane 16, which is secured to the front wall at a position slightly above the float harness 15. Membrane 16 extends across float harness 15 to the rear wall section 11, where it is similarly secured along the entire length of the wall, but at a point at longitudinal area 54 substantially higher than the point where the membrane 16 is secured to the front wall 10.

Positioned along the front wall directly above the longitudinal area 51 but below longitudinal area 53 where the membrane 16 is secured to the front wall 10 are drain holes 17 provided with flap valves 18. The flap valve 18 is of conventional type, that is, it functions only to allow an outward flow of water from between walls 10 and 11 towards the outside of front wall 10. In one embodiment, front wall section 10 has an inwardly curving top section forming a wave catch 101 extending along the entire length of the front wall section 10, thereby making the front wall 10 substantially lower than the rear wall 11 while at the same time substantially preventing escape of turbulent water over the wall 10. The upper portion of rear wall 11 above longitudinal area 54 provides a higher wave catch 132.

(ii) Operation of the Embodiment of FIG. 1

As a result of the above construction, the V-shaped oil containment boom 9 is set up to perform certain desirable functions. In its normal set up as shown in FIG. 1, the boom is used primarily in areas where there are rought seas, and where breaking waves 55 and whitecapped waves 56 are common, such as, for example, near shore or other shallow areas and where a breaking wave 55 contains oil particles suspended in the foam and spray part of the wave 55. By one aspect of this invention, the "V"-shaped oil containment boom 9 is able to collect the oil suspended in the spray and return it to the confined area with a minimum of interference with any of the parts of the boom. Wave catch 101, being slightly lower than rear wall 11, permits the wave 55 to break over the top curvature, thereby trapping the whitecap 56 and spray within the V-shaped cavity 110 formed between the front wall 10 and the rear wall 11. The oil laden spray is restricted to cavity 110 by the impervious membrane 16, thus guiding return to the confinement area at the ocean only through drain hole 17 and by means of flap valve 18. The normal water level of the polluted water is designated 57. At no time during the time that the oil is collected form the whitecaps and the spray and is returned to the confined area does the oil come in contact with the inflatable float 13, the float harness 15 or the inside compartment 120 of the lower submerged half of the V-shaped boom. Thus, it is seen that the oil and sludge are prevented from clogging up, eventually weighing down, and submerging the boom thereby rendering it ineffective. Since in a preferred embodiment of this invention the faces of front wall 10 and rear wall 11 are polyvinylchloride coated, accumulation of oil and sludge on the exposed surfaces is further minimized.

(iii) Description of FIG. 2

The advantages discussed above have been based on construction features of aspects of this invention which make the V-shaped boom inherently light weight. Therefore, storage should be relatively easy. To facilitate further this storage operation, FIG. 2 discloses an embodiment of the invention wherein the inflatable float 13 has been deflated with the use of air valve 131. Consequently, it is now possible to coverage the two wall sections 10 and 11, thereby making the boom flat as a sandwich of two walls 10 and 11 as outer layers and the deflated float 13, harness 15, membrane 16 and ballast 14 therebetween. The boom is therefore easy to roll up by conventional means, for stowage aboard a ship.

(iv) Operation of the Embodiment of FIG. 3

The present invention is also adapted to operate as shown in FIG. 3, namely in the schematic sequences of FIGS. 3a, 3b, 3c, 3d and 3e. If a large floating object such as ice floe 301 is being retained by the boom 9, a great deal of pressure is exerted on the various parts of the boom 9 and the risk of severing the boom 9 is quite great. The resulting loss of oil would then be significant. Due to the construction of this invention, the V-shaped boom 9 has the floating means, namely inflatable float 13 positioned approximately in the vertical centre. Lead ballast 14 maintains the boom in its normal upright position, and thus prevents relatively small particles as well as the oil from escaping from the confined area. However, if a large floating object such as, for example, large sections of floating ice 301 have become confined and press against the boom, the sequence in FIGS. 3a-3e shows how the boom permits escape of the large ice sections with a minimum loss of oil. When encountering the ice, the boom is lifted above the ice by being rotated about the horizontal axis 302 of the inflatable float 13 as seen in FIGS. 3a and 3b. Axis 302 is slightly above the level of the water. Since there are no external points to interfere with the ice 301, the boom 9 is allowed to slip over the ice as seen in FIG. 3c. Once the ice has passed, as in FIG. 3d, the boom is free to return to its normal position, as shown in FIG. 3e.

Admittedly, a small amount of oil escapes from the confined area along with the ice while the V-shaped boom is temporarily elevated above the water surface. However, this amount of escaped oil is insignificant when compared to the oil that could be lost if the boom was severed completely. This situation would be even more hazardous in rough seas, where the oil is likely quickly to disperse and shift from one area to another much more quickly.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. An oil containment boom comprising: an elongated member of generally V-shaped cross section including a front wall section and a rear wall section joined together along respective lower edges; ballast means located at the joint between the front and rear walls for normally maintaining said elongated member upright; float means disposed between said front wall and said rear wall at a predetermined and preselected level above said joint; liquid deflecting means positioned above said float means and secured to said front and rear walls in a watertight manner to form a catch basin in the upper portion of said boom so that liquid is prevented from entering said boom below the level of said liquid deflecting means; and drainage means within one of said walls adapted to permit liquid which is trapped within said catch basin to escape therefrom to a location outside of one of said walls.

2. The oil containment boom of claim 1, wherein said liquid deflecting means comprising a collapsible membrane.

3. The oil containment boom of claim 1, wherein said liquid deflecting means is disposed at an angle such that all trapped liquid is caused to be drained from said catch basin.

4. The oil containment boom of claim 1, wherein said float is a pneumatic tube, and further comprising valve means for inflating and deflating said pneumatic tube, so that said float is easily collapsible for convenient storage of said boom.

5. The oil containment boom of claim 1, wherein said float means is substantially centrally positioned within said V-shaped compartment to allow substantially half of said boom to be positioned below the surface of the water.

6. The oil containment boom of claim 1, wherein said drainage means comprises a flap valve.

7. The oil containment boom of claim 1, wherein said ballast means comprises a lead weight sewn to the lower edges of said front wall section and said rear wall section.

8. The V-shaped oil containment boom of claim 1, wherein said front wall section is lower than said rear wall section.

9. The V-shaped oil containment boom of claim 1, wherein said front wall section includes a flexible resilient section along its top to permit inwardly directed waves to enter the inside of the boom above said collapsible membrane means.

* * * * *